(12) United States Patent
Shinohara et al.

(10) Patent No.: US 10,598,845 B2
(45) Date of Patent: Mar. 24, 2020

(54) OPTICAL DEVICE AND OPTICAL SYSTEM

(71) Applicant: OMRON Corporation, Kyoto-shi, Kyoto (JP)

(72) Inventors: Masayuki Shinohara, Nagaokakyo (JP); Kazuyuki Okada, Ritto (JP); Yasuhiro Tanoue, Otsu (JP); Norikazu Kitamura, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 165 days.

(21) Appl. No.: 15/902,786

(22) Filed: Feb. 22, 2018

(65) Prior Publication Data

US 2018/0180792 A1 Jun. 28, 2018

Related U.S. Application Data

(63) Continuation of application No. PCT/JP2016/074892, filed on Aug. 25, 2016.

(30) Foreign Application Priority Data

Oct. 7, 2015 (JP) .................................. 2015-199578

(51) Int. Cl.
*G02B 27/14* (2006.01)
*F21V 8/00* (2006.01)
(Continued)

(52) U.S. Cl.
CPC ........... *G02B 6/0033* (2013.01); *G02B 6/006* (2013.01); *G02B 6/0063* (2013.01);
(Continued)

(58) Field of Classification Search
CPC .................................................. G02B 6/0033
(Continued)

(56) References Cited

U.S. PATENT DOCUMENTS

2009/0168458 A1 7/2009 Lai et al.
2009/0316072 A1 12/2009 Okumura et al.
(Continued)

FOREIGN PATENT DOCUMENTS

CN 101471006 A 7/2009
CN 101473167 A 7/2009
(Continued)

OTHER PUBLICATIONS

An English translation of the International Search Report of PCT/JP2016/074892 dated Nov. 1, 2016.
An English translation of the Written Opinion of PCT/JP2016/074892 dated Nov. 1, 2016.
The Chinese Office Action (CNOA) dated Aug. 5, 2019 in a counterpart Chinese patent application.

*Primary Examiner* — James C. Jones
(74) *Attorney, Agent, or Firm* — Metrolex IP Law Group, PLLC

(57) ABSTRACT

An optical device includes: a light guide plate; a first light emission part provided in a first region of the light guide plate, the first light emission part having optical surfaces that cause the light incident thereon to exit from a first emission surface and a second emission surface opposite the first emission surface; and a second light emission part provided in a second region of the light guide plate, the second light emission part having optical surfaces that cause the light incident thereon to exit from the first emission surface and the second emission surface. The optical device configured to control the luminous flux from the first and second emission surfaces via the optical surfaces in the first and second light emission parts to thereby control how leaked light is perceived by an observer on the opposite side of the emission surface of the light guide plate.

15 Claims, 14 Drawing Sheets

(51) Int. Cl.
*G09F 13/18* (2006.01)
*G09F 19/12* (2006.01)
*G02B 30/56* (2020.01)
*G02B 30/60* (2020.01)
*G02B 27/09* (2006.01)

(52) U.S. Cl.
CPC ......... *G02B 27/0977* (2013.01); *G02B 30/56* (2020.01); *G02B 30/60* (2020.01); *G09F 13/18* (2013.01); *G09F 19/12* (2013.01); *G02B 6/0036* (2013.01)

(58) Field of Classification Search
USPC .......................................................... 359/636
See application file for complete search history.

(56) References Cited

U.S. PATENT DOCUMENTS

2013/0044497 A1* 2/2013 Sakamoto ............ G02B 6/0008
362/311.04
2013/0153934 A1 6/2013 Meitl et al.

FOREIGN PATENT DOCUMENTS

| | | |
|---|---|---|
| CN | 101473167 B | 4/2011 |
| CN | 103155176 A | 6/2013 |
| CN | 204577029 U | 8/2015 |
| JP | 2002-297070 A | 10/2002 |
| JP | 2002-297072 A | 10/2002 |
| JP | 5701434 B1 | 4/2015 |

* cited by examiner

OPTICAL DEVICE AND OPTICAL SYSTEM

CROSS REFERENCE TO RELATED APPLICATIONS

This application is a continuation application of International Application No. PCT/JP2016/074892, filed on Aug. 25, 2016, which claims priority based on the Article 8 of Patent Cooperation Treaty from prior Japanese Patent Application No. 2015-199578, filed on Oct. 7, 2015, the entire contents of which are incorporated herein by reference.

BACKGROUND

Technical Field

The disclosure relates to an optical device and an optical system.

A point light display that activates two display bodies simultaneously or alternately wherein the point light display has two joined light guide plates each having a plurality of reflective dots made up of fine recesses is publicly known (for example, see Japanese Patent Publication No. 2002-297070).

Technical Problem

Fresnel reflections at the emission surface of a transparent light guide plate causes some light that should exit from the emission surface to also leak from the rear surface opposite the emission surface. Further, light tends to leak from the rear surface after passing through a plurality of optical surfaces formed on the rear surface of the light guide plate. As such, even a person on the opposite side of the emission surface of the light guide plate may accidentally see a pattern or the like due to the leaked light.

SUMMARY

According to a first embodiment, an optical device includes: a light guide plate that guides light in a plane parallel to a first emission surface; a first light emission part provided in a first region of the light guide plate, the first light emission part having a plurality of optical surfaces whereon light guided by the light guide plate is incident, the optical surfaces causing the light incident thereon to exit from the first emission surface and a second emission surface opposite the first emission surface; and a second light emission part provided in a second region of the light guide plate, the second light emission part having a plurality of optical surfaces whereon light guided by the light guide plate is incident, the optical surfaces causing the light incident thereon to exit from the first emission surface and the second emission surface, wherein the luminous flux from the first emission surface by each of the plurality of optical surfaces included in the first light emission part is greater than the luminous flux from the second emission surface by each of the plurality of optical surfaces included in the first light emission part, and the luminous flux from the second emission surface by each of the plurality of optical surfaces included in the second light emission part is greater than the luminous flux from the first emission surface by each of the plurality of optical surfaces included in the second light emission part.

The luminous flux per unit area emitted from the second emission surface by the second light emission part in a portion adjacent to the first region within the second region may be substantially the same as the luminous flux per unit area emitted from the second emission surface by the first light emission part in a portion adjacent to the second region within the first region.

The luminous flux from the second emission surface by the second light emission part in the second region may decrease as the distance of the second light emission part from the first region increases.

The pattern density of the plurality of optical surfaces included in the second light emission part may decrease as the distance of the optical surfaces from the first region increases.

The area of the plurality of optical surfaces included in the second light emission part may decrease as the distance of the optical surfaces from the first region increases.

The second light emission part may be provided on the surface opposite the surface whereon the first light emission part is provided.

The first light emission part may be provided on the second emission surface of the light guide plate, and the second light emission part may be provided on the first emission surface.

The light emitted from the first emission surface by the first light emission part may produce an image configured for viewing from a position near the first emission surface outside the light guide plate.

The second light emission part causes the second emission surface to emit light which produces an image that is blurrier than the image produced by the light emitted from the first emission surface.

The second light emission part is provided in the first region and the second region, the second light emission part emitting light of a complementary color to the color of the light emitted from the second emission surface by the first light emission part, and the luminous flux from the second emission surface by the first light emission part and the second light emission part may be substantially uniform over the first region and the second region.

The second light emission part is provided in the first region and the second region and emits white light from the second emission surface, and the luminous flux from the second emission surface by the second light emission part may be greater than the luminous flux from the second emission surface by the first light emission part.

The first light emission part includes a plurality of light focusing portions each having optical surfaces whereon the light guided by the light guide plate is incident, the optical surfaces causing the first emission surface to emit light in the direction in which the emission light substantially converges on a single convergence point or convergence line in a space, or substantially diverges from a single convergence point or convergence line in a space, and the convergence points or the convergence lines are mutually different among the plurality of light focusing portions and a group of the plurality of convergence points or convergence lines may form an image in a space.

Each plurality of light focusing portions may be formed along a predetermined line in a plane parallel to the first emission surface.

The second light emission part includes a plurality of second light focusing portions each having optical surfaces whereon the light guided by the light guide plate is incident, the optical surfaces causing the second emission surface to emit light in the direction in which the emission light substantially converges on a single convergence point or convergence line in a space, or substantially diverges from a single convergence point or convergence line in a space, and the convergence points or the convergence lines of light emitted from the second light emission part are mutually different among the plurality of second light focusing portions and a group of the plurality of convergence points or convergence lines of light emitted from the second light emission part forms an image in a space.

The pattern density of the plurality of optical surfaces included in the first light emission part may be less than or equal to 30%.

An optical system according to a second embodiment includes: an optical device as described above; and a second optical device provided to face the second emission surface of the optical device, wherein the second optical device includes: a second light guide plate that guides light in a plane parallel to an emission surface; and a light emission part having a plurality of optical surfaces whereon the light guided by the light guide plate is incident, the optical surfaces causing the light incident thereon to exit from the emission surface of the second light guide plate, and the surface opposite the emission surface of the second light guide plate faces the second emission surface of the light guide plate; the light emitted from the first emission surface by the plurality of optical surfaces included in the first light emission part forms an image configured for viewing from a position near the first emission surface outside the light guide plate; and the light emitted from the emission surface by the plurality of optical surfaces included in the light emission part of the second light guide plate forms an image configured for viewing from a position near the emission surface outside the second light guide plate.

It should be noted that the above-described Summary does not include all the characteristics of one or more embodiments. The sub-combination of these characteristics may also be one or more embodiments.

DETAILED DESCRIPTION

Hereinafter, one or more embodiments are described; however, the following one or more embodiments do not limit the claimed invention. Further, all the combinations of the features described in one or more embodiments are not necessarily required to solve the problem.

Figure 1:
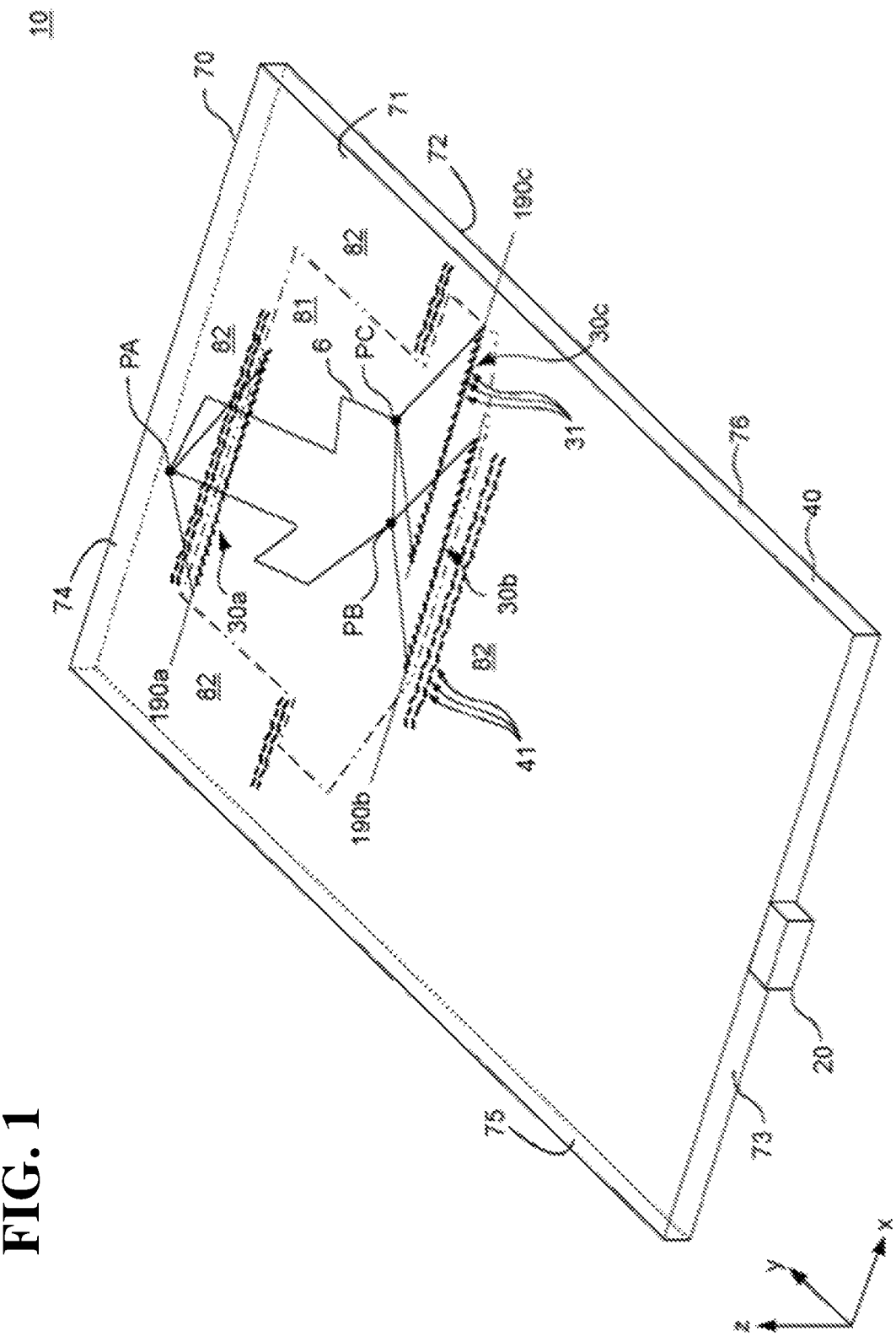
FIG. 1 is a diagram schematically illustrating a display device according to one or more embodiments along with a stereoscopic image projected into a space.

FIG. 1 schematically illustrates a display device 10 according to one or more embodiments along with a stereoscopic image projected into space. To facilitate understanding, the drawings used in the description of one or more embodiments are schematically illustrated. In some cases the drawings used for the description of one or more embodiments may not be to scale.

The display device 10 includes an emission surface 71 wherefrom light is emitted. The display device 10 forms an image 6 as a stereoscopic image by way of the light exiting the emission surface 71. A user may recognize the image 6 as the stereoscopic image in a space. Here, the "stereoscopic image" implies an image that is recognized as being located at a different location from the emission surface 71 of the display device 10. The stereoscopic image includes, for example, a 2D image recognized as being at a location away from the emission surface 71 of the display device 10. That is, the stereoscopic image conceptually includes not only images recognized as a stereoscopic shape but also 2D images recognized as being at a different location from the display surface of the display device 10.

The display device 10 includes a light guide plate 70 and a light source 20. The light guide plate 70 is molded using a transparent resin material having a relatively high refractive index. The light guide plate 70 may be made up of, for example, a polycarbonate resin (PC), a polymethyl methacrylate resin (PMMA), glass or the like. The light guide plate 70 is an example of an optical device. The display device 10 is an example of an optical system.

The light guide plate 70 includes the emission surface 71 and a rear surface 72 opposite the emission surface 71. The emission surface 71 is one principal surface of the light guide plate 70. The rear surface 72 is the other principal surface of the light guide plate 70. The light guide plate 70 has four edge faces, an edge face 73, an edge face 74, an edge face 75, and an edge face 76. Light enters the light guide plate 70 from the edge face 73. A light source 20 is provided at the edge face 73. Light from the light source 20 enters the light guide plate 70 through the edge face 73. The edge face 74 is opposite the edge face 73. The edge face 76 is opposite the edge face 75.

In the description of one or more embodiments, the right-handed rectangular coordinate system composed of x-axis, y-axis, and z-axis may be used. The z-axis direction is defined as being perpendicular to the emission surface 71. The direction from the rear surface 72 to the emission surface 71 is defined as the positive z-axis direction. Further, the y-axis direction is defined as perpendicular to the edge face 73. The direction from the first edge 73 to the second edge 74 is defined as the positive y-axis direction. The x-axis is perpendicular to the edge face 75 and the edge face 76, and the direction from the edge face 75 to the edge face 76 is defined as the positive x-axis direction. For the sake of brevity, a plane parallel to the x-y plane, a plane parallel to the y-z plane, and a plane parallel to the x-z plane may be referred to as an x-y plane, a y-z plane, and an x-z plane, respectively.

The light source 20 is, for example, an LED light source. The optical axis of the light source 20 is substantially parallel to the y-axis. The light from the light source 20 enters the edge face 73. The light entering the edge face 73 from the light source 20 travels through the light guide plate 70 while being totally reflected between the emission surface 71 and the rear surface 72 and spreading in the light guide plate 70 in a plane parallel to the emission surface. The center of light guided by the light guide plate 70 is substantially parallel to the y-axis. As such, the light guide plate 70 guides the light from the light source 20 while the light spreads in planar form in the plane parallel to the emission surface 71. A light beam passing through each point in the light guide plate 70 has a spread angle that is less than a prescribed angle. Specifically, the spread angle is measured about a direction connecting locations in the light guide plate 70 and the light source 20; the spread angle of light guided in the light guide plate 70 is less than a prescribed angle. Specifically, the light beam passing through locations in the light guide plate 70 has a spread angle in the x-y plane about a direction connecting each point in the light guide plate 70 and the light source 20; and, the spread angle is less than a prescribed angle. In the present specification, the spread of the light beams passing through points inside and outside the light guide plate is the spread of light assuming that the light beam is considered the light diverging from the aforementioned points. Further, the spread of the light beams passing through points inside and outside the light guide plate may be simply referred to as "the spread of light."

A plurality of light focusing portions 30 including a light focusing portion 30a, a light focusing portion 30b, and a light focusing portion 30c is formed on the rear surface 72 of the light guide plate 70. The light focusing portions 30 are formed substantially in series along the x-axis direction. Light enters the light guide plate 70 from the light source 20 through the edge face 73; the light is guided by the light guide plate 70 while being totally reflected between the emission surface 71 and the rear surface 72; and the light is incident on each point along the x-axis direction of the light focusing portion 30.

Here, the light guided by the light guide plate 70 does not spread in a direction along the y-z plane. The light focusing portion 30 substantially focuses the light incident on each point of the light focusing portion 30 on a fixed point each corresponding to the light focusing portion 30. FIG. 1 particularly illustrates the light focusing portion 30a, the light focusing portion 30b, and the light focusing portion 30c as a part of the light focusing portion 30, showing how a plurality of light rays emitted from each of the light focusing portion 30a, the light focusing portion 30b, and the light focusing portion 30c converges.

Specifically, the light focusing portion 30a corresponds to a fixed point PA on an image 6. The light rays from each point of the light focusing portion 30a converge on the fixed point PA. Thus, the wave front of light from the light focusing portion 30a appears like the wave front of light emitted by the fixed point PA. Similarly, the light focusing portion 30b corresponds to a fixed point PB on an image 6, and the light rays from each point of the light focusing portion 30b converge on the fixed point PB. Further, the light focusing portion 30c corresponds to a fixed point PC on an image 6, and the light rays from each point of the light focusing portion 30c converge on the fixed point PC. As such, the light rays from each point of a given light focusing portion 30 substantially converges on the fixed point corresponding to the light focusing portion 30. It is thus possible for a given light focusing portion 30 to supply a light wave front that appears to be emitted from the corresponding fixed point. The fixed points whereto each light focusing portion 30 corresponds are mutually different, and a group of a plurality of fixed points each corresponding to the light focusing portion 30 forms an image 6 that can be seen in a space. As such, the light emitted from the emission surface 71 by a plurality of reflective surfaces included in the light focusing portion 30 forms an image that can be seen at a position near the emission surface 71 outside the light guide plate 70. Thereby, the display device 10 projects a stereoscopic image into a space.

According to one or more embodiments, each light focusing portion 30 includes multiple reflective surfaces formed substantially in series along the x-axis direction. The reflective surfaces included on a single light focusing portion 30 are oriented in mutually different directions, and reflect incident light onto a single fixed point corresponding to the light focusing portion 30. Thereby, the light reflected from the reflective surfaces included in each light focusing portion 30 converges on the fixed point corresponding to the light focusing portion 30. For example, multiple light rays reflected by each of the plurality of reflective surfaces included in the light focusing portion 30a converge on the fixed point PA. The multiple light rays reflected by each of the plurality of reflective surfaces included in the light focusing portion 30b converge on the fixed point PB. The multiple light rays reflected by each of the plurality of reflective surfaces included in the light focusing portion 30c converges on the fixed point PC.

As described above, the spread angle is measured about a direction connecting locations in the light guide plate 70 and the light source 20; the spread angle of the light guided by the light guide plate 70 in the x-y plane is less than the prescribed angle. That is, the light guided by the light guide plate 70 does not spread substantially in the x-y plane about the direction connecting each point in the light guide plate 70 and the light source 20. If the light focusing portion 30 is provided at a position away from the light source 20, the light guided by the light guide plate 70 travels substantially in a direction with the y-axis direction as the center and does not spread substantially in the x-y plane. Thus, for example, the light from the light focusing portion 30a converges on substantially one fixed point in the plane including the fixed point PA and parallel to the x-z plane.

As shown in FIG. 1, the light focusing portion 30a is formed along a line 190a. The light focusing portion 30b is formed along a line 190b. The light focusing portion 30c is formed along a line 190c. Here, the line 190a, the line 190b, and the line 190c are substantially parallel to the x-axis. A given light focusing portion 30 is formed substantially in series along a line substantially parallel to the x-axis.

As such, the light focusing portion 30 is formed along each predetermined line in a plane parallel to the emission surface 71. Each light focusing portion 30 receives the light guided by the light guide plate 70 and causes the emission surface 71 to output emission light along a direction so that the emission light converges substantially onto a single convergence point in a space. Note that the emission light is output along a direction so that the emission light radiates from the fixed point when the fixed point is located near the rear surface 72 of the light guide plate 70. Therefore, when the fixed point is near the rear surface 72 of the light guide plat 70, the reflective surfaces included in the light focusing portion 30 causes the emission surface 71 to output the emission light along a direction so that the emission light radiates from substantially one convergence point in space.

When the light guided by the light guide plate 70 does not spread in a direction along the y-z plane, the light from the light focusing portion 30 substantially converges on a fixed point as described above. Whereas, when the light guided by the light guide plate 70 spreads in a direction along the y-z plane, the light reflected from the reflective surfaces of the light focusing portion 30 substantially converges on a convergence line parallel to the y-z plane and parallel to the emission surface. For example, the light from the light focusing portion 30a substantially converges on the line that includes PA and is parallel to the y-z plane and the emission surface. Similarly, when the fixed point is near the rear surface 72 of the light guide plate 70, the reflective surfaces included in the light focusing portion 30 causes the emission surface 71 to output the emission light along a direction so that the emission light radiates from substantially one convergence point in space.

The light guide plate 70 is divided in the x-y plane into a region 81 and a region 82. The light focusing portion 30 is formed in the region 81. The region 82 is a part of the region around the region 81. The region 82 surrounds the region 81. A plurality of reflective surfaces 41 is formed in the region 82. The light incident on the plurality of reflective surfaces included in the light focusing portion 30 is emitted mainly from the emission surface 71, and partly from the rear surface 72 as leaked light. Whereas, the light incident on the plurality of reflective surfaces 41 provided in the region 82 is emitted mainly from the rear surface 72. The brightness of the light emitted from the rear surface 72 by the reflective surfaces 41 in the region 82 is substantially the same as that of the light emitted from the rear surface 72 by the reflective surfaces 31 of the light focusing portion 30. This results in less variation in the luminous flux from the rear surface 72. Thus, the leaked light from the rear surface 72 is less conspicuous to an observer near the rear surface 72.

Figure 2:
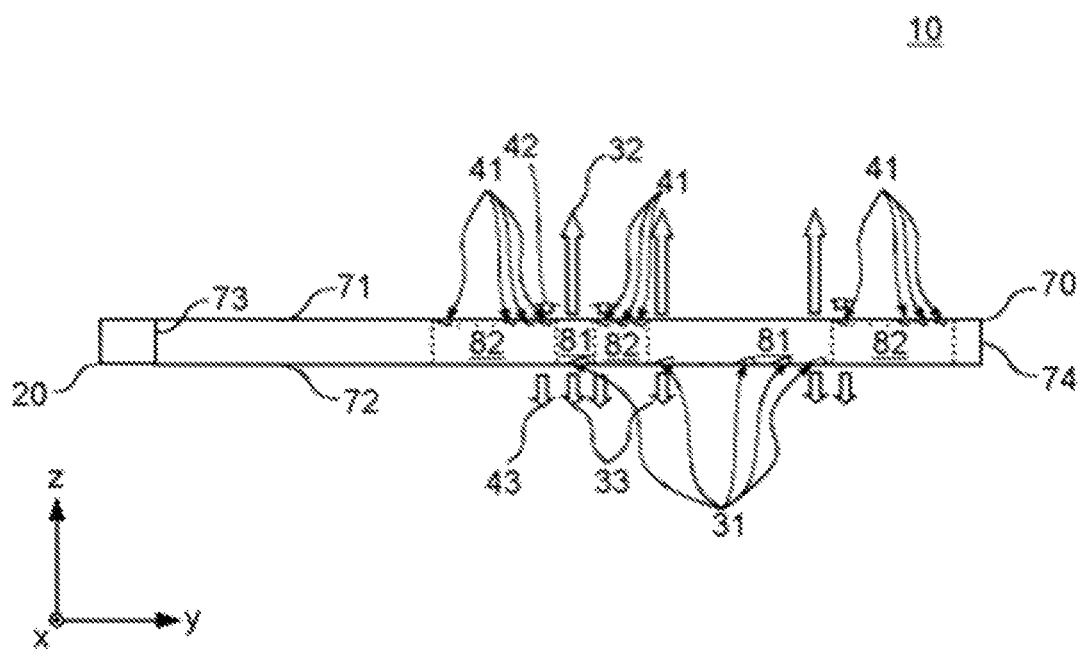
FIG. 2 is a diagram schematically illustrating a cross-section of the y-z plane of a display device.

FIG. 2 schematically illustrates a cross-section of the y-z plane of the display device 10. The reflective surfaces 31 are provided on the rear surface 72. The reflective surfaces 31 reflect a majority of the light incident thereon toward the emission surface 71. A portion of the light incident on the reflective surfaces 31 passes therethrough and is exits to the outside from the rear surface 72 as leaked light. A majority of the light reflected by the reflective surfaces 31 toward the emission surface 71 passes through the emission surface 71 and exits to the outside. A portion of the light reflected by the reflective surface 31 toward the emission surface 71 reflected at the emission surface 71, travels toward the rear surface 72, and exits from the rear surface 72 as leaked light. As such, the reflective surfaces 31 cause the light incident thereon to exit from the emission surface 71 and the rear surface 72. Here, the luminous flux 32 per unit area from the emission surface 71 by each of the plurality of reflective surfaces 31 formed in the region 81 is greater than the luminous flux 33 per unit area from the rear surface 72 by each of the plurality of reflective surfaces 31 formed in the region 81.

Whereas, the reflective surfaces 41 are provided on the emission surface 71. The reflective surfaces 41 reflect a majority of the light incident thereon toward the rear surface 72. A portion of the light incident on the reflective surfaces 41 passes therethrough and exits to the outside from the emission surface 71 as leaked light. A majority of the light reflected by the reflective surfaces 41 toward the rear surface 72 passes through the rear surface 72 and exits to the outside. A portion of the light reflected by the reflective surface 41 toward the rear surface 72 reflects at the rear surface 72 toward the emission surface 71 and is emitted from the emission surface 71. As such, the reflective surfaces 41 cause the light incident thereon to exit from the emission surface 71 and the rear surface 72. Here, the luminous flux 43 per unit area emitted from the rear surface 72 by each of the plurality of reflective surfaces 41 formed in the region 82 is greater than the luminous flux 42 per unit area emitted from the emission surface 71 by each of the plurality of reflective surfaces formed in the region 82.

In the luminous flux per unit area emitted from the rear surface 72, the luminous flux 43 emitted from the region 82 is substantially the same as the luminous flux 33 emitted from the region 81, at least in a portion adjacent to the boundary between the region 81 and the region 82. That is, the luminous flux per unit area emitted from the rear surface 72 by the reflective surfaces 41 in a portion adjacent to the region 81 within the region 82 is substantially the same as the luminous flux per unit area emitted from the rear surface 72 by the reflective surfaces 31 in a portion adjacent to the region 82 within the region 81. Thereby, this presents the boundary between the region 81 and the region 82 from being conspicuous.

Figure 3:
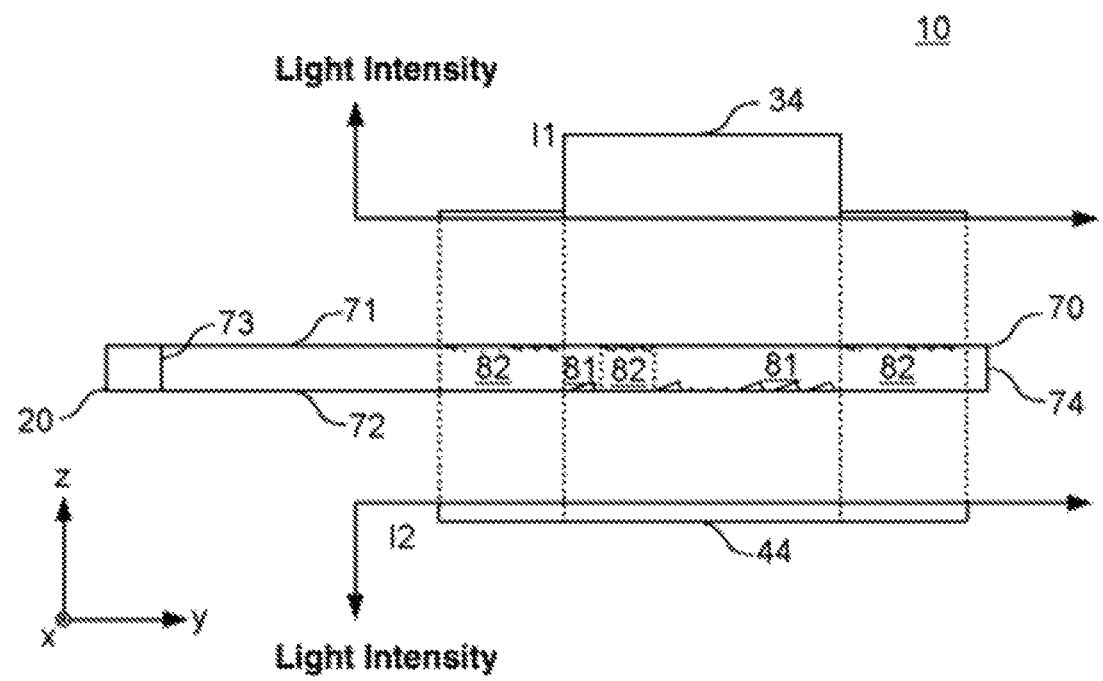
FIG. 3 is a diagram illustrating the distribution of the luminous flux per unit area emitted from each of an emission surface and a rear surface.
Figure 4:
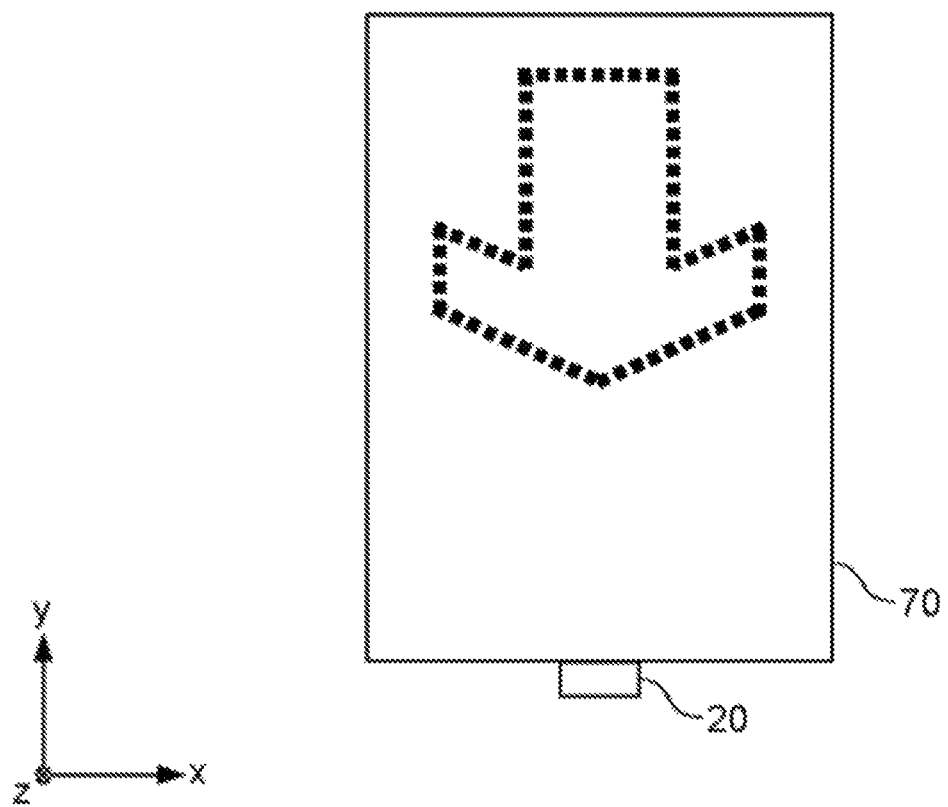
FIG. 4 is a diagram schematically illustrating the leaked light from a rear surface when a reflective surface is not provided.
Figure 5:
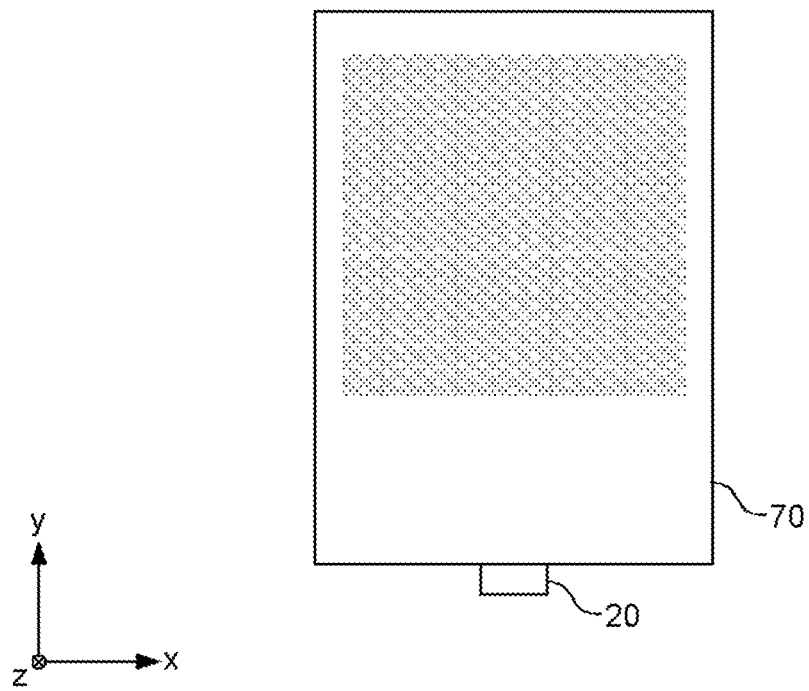
FIG. 5 is a diagram schematically illustrating the leaked light from a rear surface when a reflective surface is provided.

FIG. 3 illustrates the distribution of the luminous flux per unit area emitted from the emission surface 71 and the rear surface 72. FIG. 4 schematically illustrates the leaked light from the rear surface 72 when a) reflective surfaces 41 are provided. FIG. 5 schematically illustrates the leaked light from the rear surface 72 when the reflective surfaces 41 are provided.

The distribution 44 is a luminous flux distribution of light from the rear surface 72 along the y-axis. A distribution 34 is a luminous flux distribution of light from the emission surface 71 along the y-axis. As illustrated in the distribution 44, the luminous flux from the rear surface 72 along the y-axis direction is substantially uniform over the region 81 and the region 82. Thereby, this prevents a pattern formed by the leaked light from the region 81 from being conspicuous when viewing from the rear surface 72.

As illustrated by the distribution 34, some light leaks from the emission surface 71 in the region 82. However, the luminous flux leaked from the region 82 is less than the luminous flux from the region 81, and thus the light leaked from the region 82 does not significantly affect the way the image is viewed.

As shown in FIG. 4, without the reflective surfaces 41, an image corresponding to the image 6 is conspicuous when looking from the rear surface 72. But, the image corresponding to the image 6 can be made less conspicuous by providing the reflective surfaces 41 as shown in FIG. 5. As such, an image formed by the light emitted from the rear surface 72 is made blurrier than the image formed by the light emitted from the emission surface 71 by providing the reflective surfaces 41.

The luminous flux I2 emitted from the region 82 can be adjusted by at least either the pattern density or the surface area of the reflective surfaces 41. For example, when the pattern density of the reflective surfaces 41 is substantially the same as the pattern density of the reflective surfaces 31, the area S2 of the reflective surface 41 may be (I2/I1)×S1, where I1 represents the luminous flux per unit area from the emission surface 71 in the region 81, and S1 represents the area of the reflective surfaces 31. At least either the length along the x-axis direction or the height along the z-axis direction may be adjusted to modify the area of the reflective surfaces 41. Whereas, when the area S2 of the reflective surfaces 41 is substantially the same as the area S1 of the reflective surfaces 31, the pattern density D2 of the reflective surfaces 41 may be (I2/I1)×D1, where D1 represents the pattern density of the reflective surfaces 41. As such, S2×D2 may be made to match (I2/I1)×S1×D1. S1 is preferably less than or equal to 30%.

Figure 6:
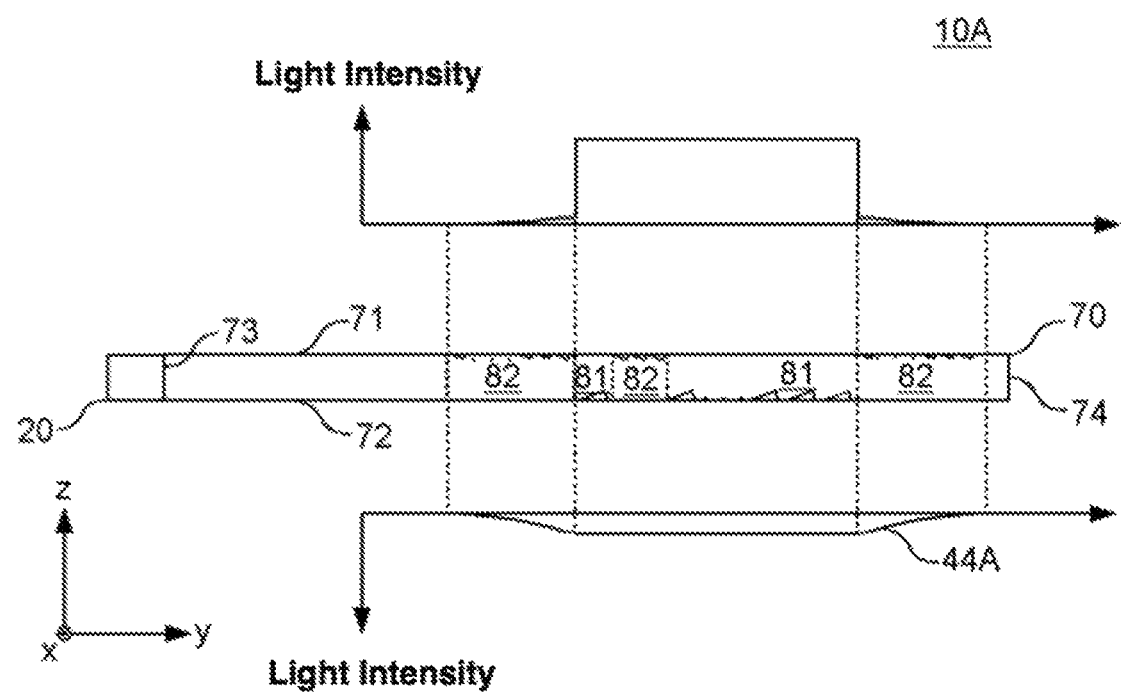
FIG. 6 is a diagram schematically illustrating a cross-section of the y-z plane of a display device that is a variation.

FIG. 6 schematically illustrates a cross-section of the y-z plane of a display device 10A that is a variation of the display device 10 along with the luminous flux distribution. The display device 10A has the same structure as the display device 10 except for the difference in the luminous flux distribution of light from the region 82.

As illustrated by the distribution 44A, the luminous flux from the region 82 decreases as the distance from the region 81 increases. According to the display device 10A, it is possible to make both an image corresponding to the image 6 and the end part of the region 82 less conspicuous. The luminous flux distribution of light from the region 82 may be a distribution plotted in coordinates (coordinates in the x-y plane) represented or approximated via Fermi distribution function with the luminous flux from the region 81 as the maximum value. Plotting the luminous flux distribution in this manner can thus prevent the distribution from being non-contiguous. The luminous flux distribution of light from the region 82 may be represented by monotonically decreasing lines, monotonically decreasing curves, or a combination of monotonically decreasing lines and curves. The luminous flux distribution of light from the region 81 and the luminous flux distribution of light from the region 82 do not need to be completely connected and a difference between the luminous flux of both regions does not cause any problems unless the difference is conspicuous to an observer.

As described above, the luminous flux I2 emitted from the region 82 is adjusted at least by modifying either the pattern density or the surface area of the reflective surfaces 41. To decrease the luminous flux from the rear surface 72 with increasing distance away from the region 81 as depicted by the distribution 44A, the plurality of reflective surfaces 41A may be formed with decreasing pattern density as the distance thereof away from the region 81 increases. Further, the area of the plurality of reflective surfaces 41 may decrease as the distance thereof away from the region 81 increases.

Figure 7A:
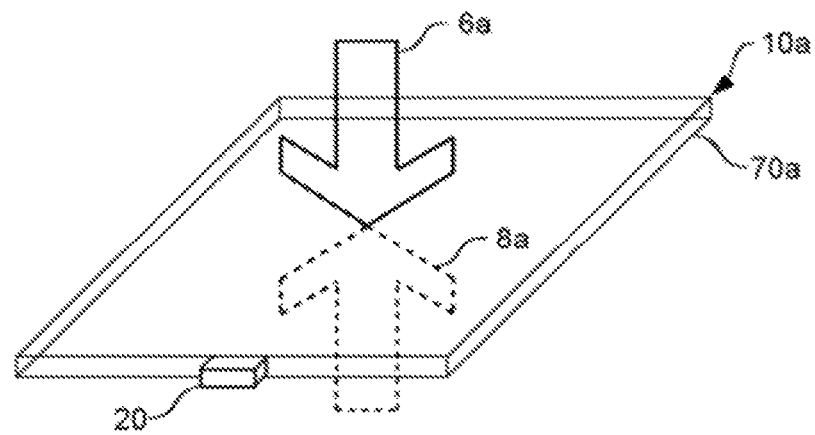
FIG. 7A, FIG. 7B, and FIG. 7C are diagrams schematically illustrating a display device that is a variation along with a stereoscopic image projected into space.
Figure 7B:
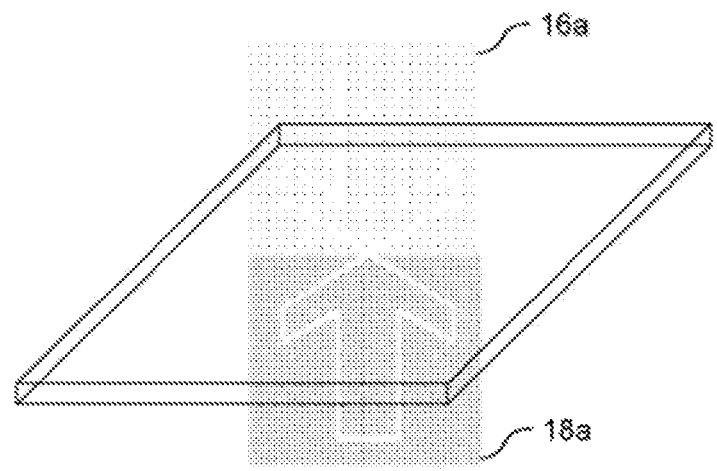
Figure 7C:
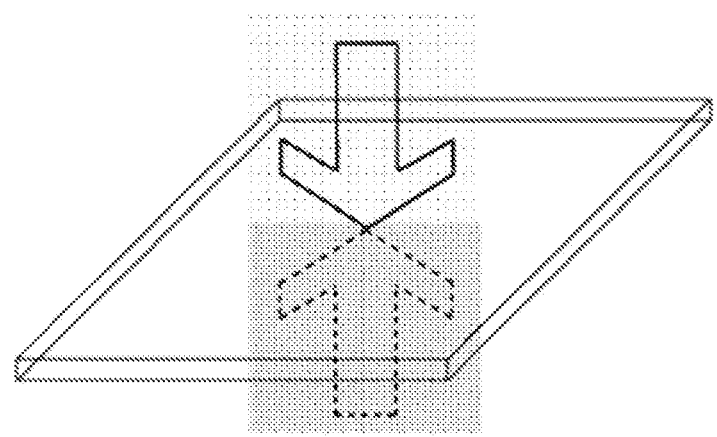

FIG. 7A, FIG. 7B, and FIG. 7C schematically illustrate a display device 10a that is a variation of the display device 10a along with a stereoscopic image projected into a space. The light guide plate 70a included in the display device 10a is different from the light guide plate 70 in that the images formed by the light focusing portions near the emission surface 71a and the rear surface 72a are different from the images formed using the above light guide plate 70.

FIG. 7A illustrates an image 6a and an image 8a that are produced by the light focusing portion formed on the rear surface 72 along with the display device 10a. The image 6a is a stereoscopic image, which is produced from the light emitted toward the emission surface 71 by the light focusing portion formed on the rear surface 72. The image 8a is a stereoscopic image produced from the light that is emitted by the light focusing portion formed on the rear surface 72 and leaked from the rear surface 72. The image 6a near the emission surface 71 is brighter than the image 8a near the rear surface 72.

FIG. 7B illustrates an image 18a and an image 16a that are produced by the light focusing portion formed on the emission surface 71 along with the display device 10a. The light focusing portion similar to the light focusing portion 30 is formed on the light emission surface 71 to emit the light creating the stereoscopic image 18a toward the rear surface 72. The image 18a is produced in a space where the image 8a is not actually produced. The area of the reflective surfaces in the light focusing portion forming the image 18a is adjusted so that the brightness of the image 18a is substantially the same as the brightness of the image 8a. The stereoscopic image 16a from the leaked light near the emission surface 71 is produced by the light focusing portion formed on the emission surface 71, but the image 16a is darker than the image 18a formed near the rear surface 72.

FIG. 7C illustrates an image formed by the display device 10a. As illustrated, an image made by superimposing the image 8a on the image 18a is formed near the rear surface 72. Therefore, the image 8a shown in FIG. 7A can be made barely perceptible to an observer. The image 16a shown in FIG. 7B is quite dark compared to the image 6a shown in FIG. 7A, and thus the observer can adequately perceive the image 6a.

Figure 8:
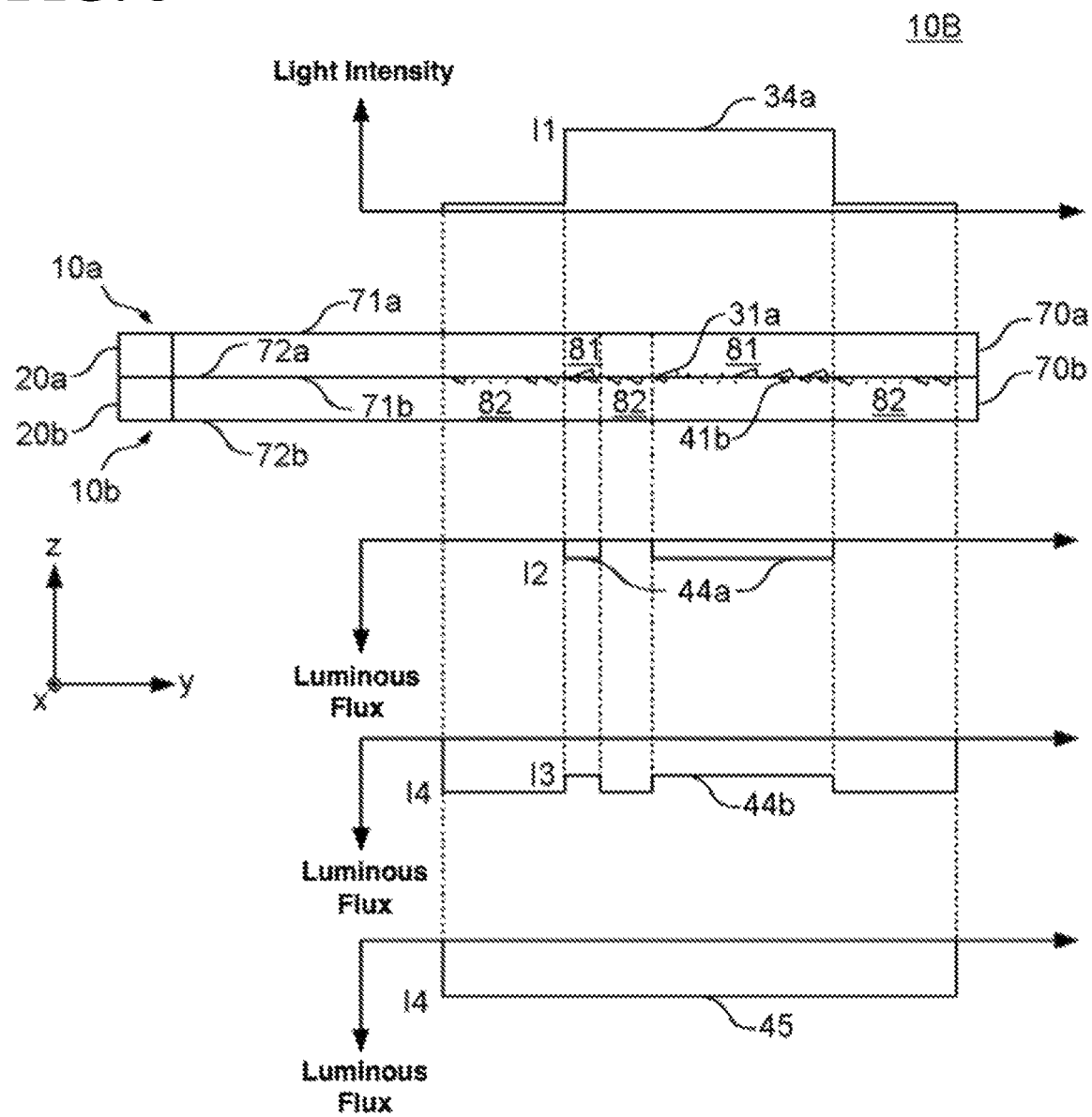
FIG. 8 is a diagram schematically illustrating a cross-section of the y-z plane of a display device that is a variation.

FIG. 8 schematically illustrates a cross-section of the y-z plane of a display device 10B as a variation of the display device 10 along with the luminous flux distribution. The display device 10B includes a display device 10a and a display device 10b. The display device 10a and the display device 10b each have a structure similar to the display device 10. The display device 10a includes a light guide plate 70a and a light source 20a. The display device 10b includes a light guide plate 70b and a light source 20b. The light guide plate 70a and the light guide plate 70b correspond to the light guide plate 70 of the display device 10. The light source 20a and the light source 20b correspond to the light source 20 of the display device 10. Hereinafter, the differences between the components included in the display device 10a and the display device 10b, and the components included in the display device 10 are described.

The light guide plate 70a and the light guide plate 70b are provided along the positive z-axis direction in order from the light guide plate 70b to the light guide plate 70a. The light guide plate 70a includes the emission surface 71a and the rear surface 72a. The light guide plate 70b includes an emission surface 71b and the rear surface 72b. The light guide plate 70a and the light guide plate 70b are provided so that the rear surface 72a of the light guide plate 70a faces the emission surface 71b of the light guide plate 70b. When the light guide plate 70a is considered as one light guide plate, the light emission surface 71a acts as a light emission surface that outputs light to form an image, and the rear surface 72b corresponds to a surface opposite the emission surface 71a.

The light guide plate 70a includes reflective surfaces 31a corresponding to the reflective surfaces 31 in the region 81 on the rear surface 72a. A plurality of reflective surfaces like the reflective surfaces 31a is provided on the rear surface 72a. The aforementioned plurality of reflective surfaces is collectively referred to as reflective surfaces 31a. The light guide plate 70a does not include reflective surfaces corresponding to the reflective surfaces 41 on the emission surface 71a. The light source 20a emits light having a specific range of wavelengths. Specifically, the light source 20a emits light at the red wavelength. Hereby the reflective surfaces 31a provided in the region 81 emit light at the red wavelength from the emission surface 71a. Thereby, the light focusing part, which includes the reflective surfaces 31a formed on the rear surface 72a in the region 81 produces a red image corresponding to the image 6 near the emission surface 71a. The distribution 34a represents the luminous flux distribution of light from the emission surface 71a along the y-axis direction.

As in the case that light from the reflective surfaces 31 leaks through to the rear surface 72 in the display device 10, red light from the reflective surfaces 31a provided in the region 81 leaks from the rear surface 72b. The distribution 44a represents the luminous flux from the rear surface 72b along the y-axis direction. As illustrated by the distribution 44a, the luminous flux I2 emitted from the reflective surfaces 31a and leaking from the rear surface 72b is substantially uniform in the region 81.

The light guide plate 70b includes reflective surfaces 41b corresponding to the reflective surfaces 41 on the emission surface 71b in the regions 81 and 82. A plurality of reflective surfaces like the reflective surfaces 41b is provided on the emission surface 71b. Here, these reflective surfaces are collectively referred to as reflective surfaces 41b. The light guide plate 70b does not include reflective surfaces corresponding to the reflective surfaces 31 on the rear surface 72b. The light source 20b emits light having a color that is complementary to the color emitted by the light source 20a in the visible wavelength range. Specifically, the light source 20b emits light at aqua wavelengths. As such, the reflective surfaces 41b provided in the regions 81 and 82 emit light at blue-green wavelengths from the rear surface 72b. As illustrated by the distribution 44b, the reflective surfaces 41b in the region 82 of the light guide plate 70b have greater luminous flux than in the reflective surfaces 41b in the region 81.

The distribution 45 illustrates a distribution of the total luminous flux from the rear surface 72b by the reflective surfaces 31a of the light guide plate 70a and the reflective surfaces 41b of the light guide plate 70b along the y-axis direction. As illustrated by the distribution 45, the total luminous flux I4 emitted from the rear surface 72b by the reflective surfaces 31a of the light guide plate 70a and the reflective surfaces 41b of the light guide plate 70b is substantially uniform over the regions 81 and 82. The reflective surfaces 41b of the light guide plate 70b are provided on the regions 81 and 82 with at least either the area or the density of the reflective surfaces 41b adjusted so that the total luminous flux from the rear surface 72b is substantially uniform over the regions 81 and 82.

For example, the area of the reflective surfaces 41b provided in the region 82 is determined such that the luminous flux from the reflective surfaces 41b is I4 in the region 82. The area of the reflective surfaces 41b provided in the region 81 is determined to be smaller than the area of the reflective surfaces 41b provided in the region 82 considering the luminous flux of leaked light I2 from the reflective surfaces 31a in the region 81. For example, the area of the reflective surfaces 41b provided in the region 81 is determined such that the luminous flux I3 emitted from the region 81 is I4−I2. When the numerical density of the reflective surfaces 41b is uniform over the regions 81 and 82, the area of the reflective surfaces 41b provided in the region 81 may be I3/I4 times greater than the area of the reflective surfaces 41b provided in the region 82.

Here, the reflective surfaces 41b are provided in the region 81 with at least either the area or the density of the reflective surfaces adjusted such that the composite from the light emitted from the rear surface 72b by the reflective surfaces 31a provided in the region 81 and the light emitted from the rear surface 72b by the reflective surfaces 41b provided in the region 81 is substantially white light. In this case, the color of light emitted from the rear surface 72b by the reflective surfaces 41b is blue-green (for example, a cyan color) complementary to the color of the image 6.

Figure 9:
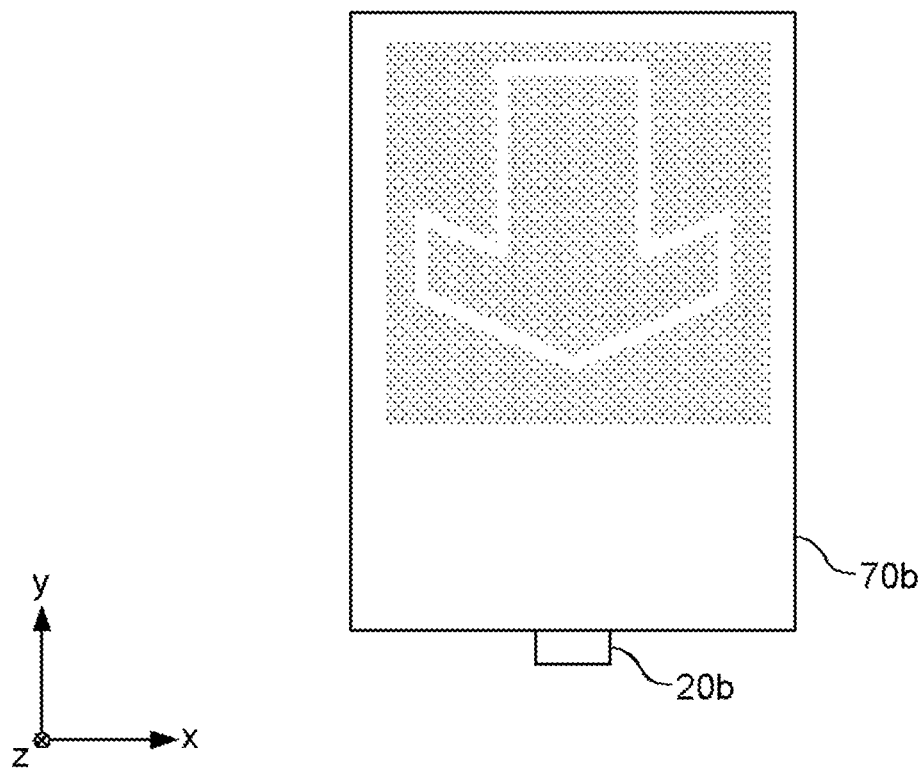
FIG. 9 is a diagram schematically illustrating leaked light from a rear surface.

FIG. 9 schematically illustrates the leaked light from the rear surface 72b. When viewed from the rear surface 72b, the color of light leaked from the rear surface 72b is a color complementary to the color of the image 6 in the region 82 around the region 81, and is white in the region 81. As described above, the total luminous flux from the rear surface 72b is substantially uniform over the regions 81 and 82. As such, the image produced by the leaked light reflecting from the reflective surfaces 31a has substantially no blurriness when using the differences in brightness as an indicator. Whereas, there is a difference in color between the region 81 and the region 82. However, the light from the region 81 that can be perceived as a pattern can be rendered substantially neutral, and thus the leaked light can be rendered a less perceptible pattern. Further, the color of light from the region 81 and the color of light from the region 82 are never complementary to each other. As such, also according to the display device 10B, it is possible to prevent the pattern produced by the leaked light from the reflective surfaces 31a in the region 81 from being conspicuous from the side of the rear surface 72b.

The light guide plate 70a of the display device 10a and the light guide plate 70b of the display device 10b can be considered as a single light guide plate. Further, it is also possible to create the same function as that of the display device 10B using a single light guide plate having one emission surface 71 and one rear surface 72 such as the light guide plate 70. It is also possible to create the same function as that of the display device 10B with a single light guide plate, for example, by using a white light source as the light source 20 and adding reflective films; more specifically, the reflective surfaces 31 formed on the rear surface 72 may have a reflective film that reflects light from a specific color wavelength range, e.g., red while the reflective surfaces 41 formed on the emission surface 71 have a reflective film that reflects the light with a wavelength range outside the aforementioned specific color wavelength range. A dichroic coating or the like may be applied to the reflective film.

Figure 10:
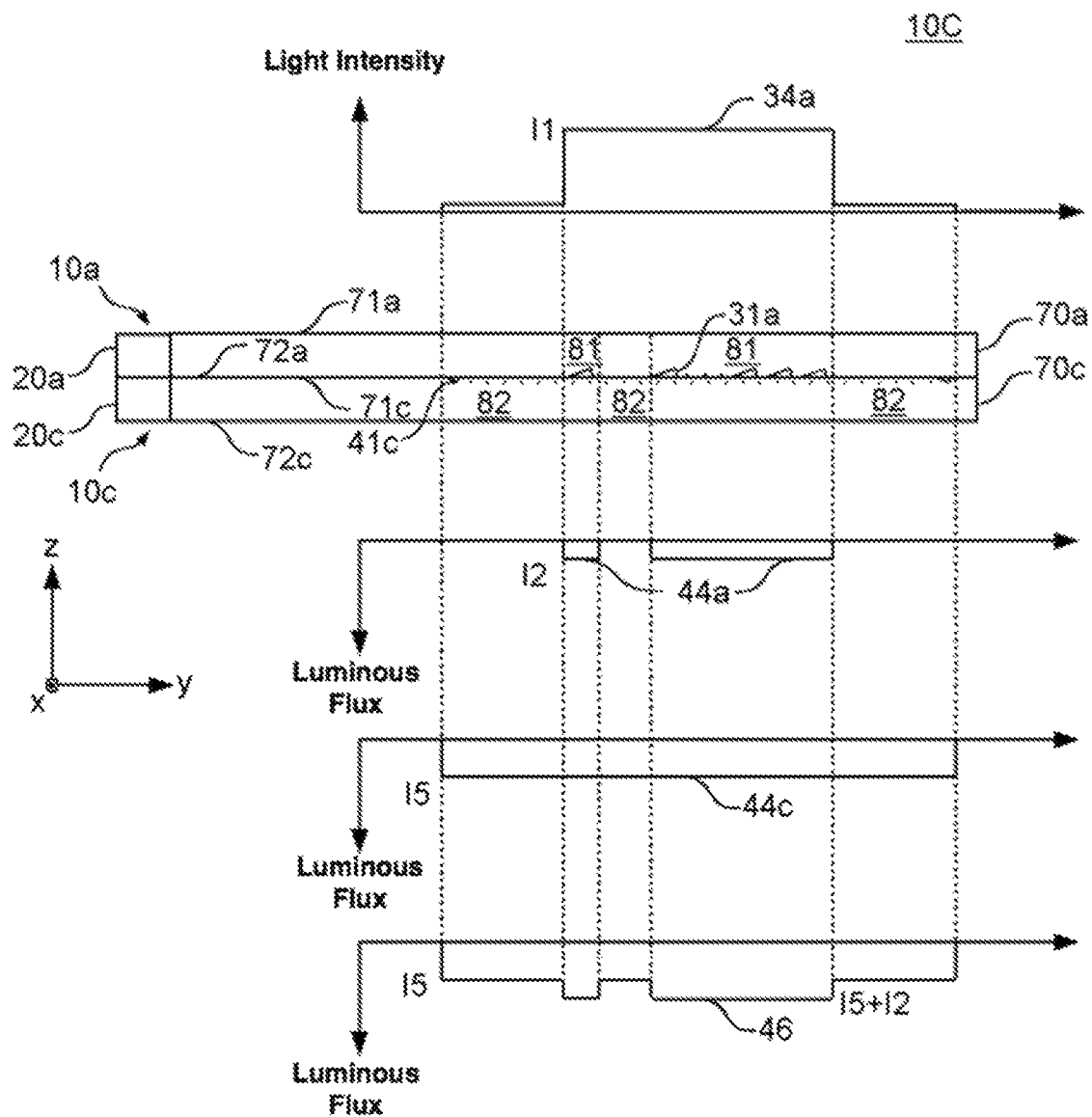
FIG. 10 is a diagram schematically illustrating a cross-section of the y-z plane of a display device that is a variation.
Figure 11:
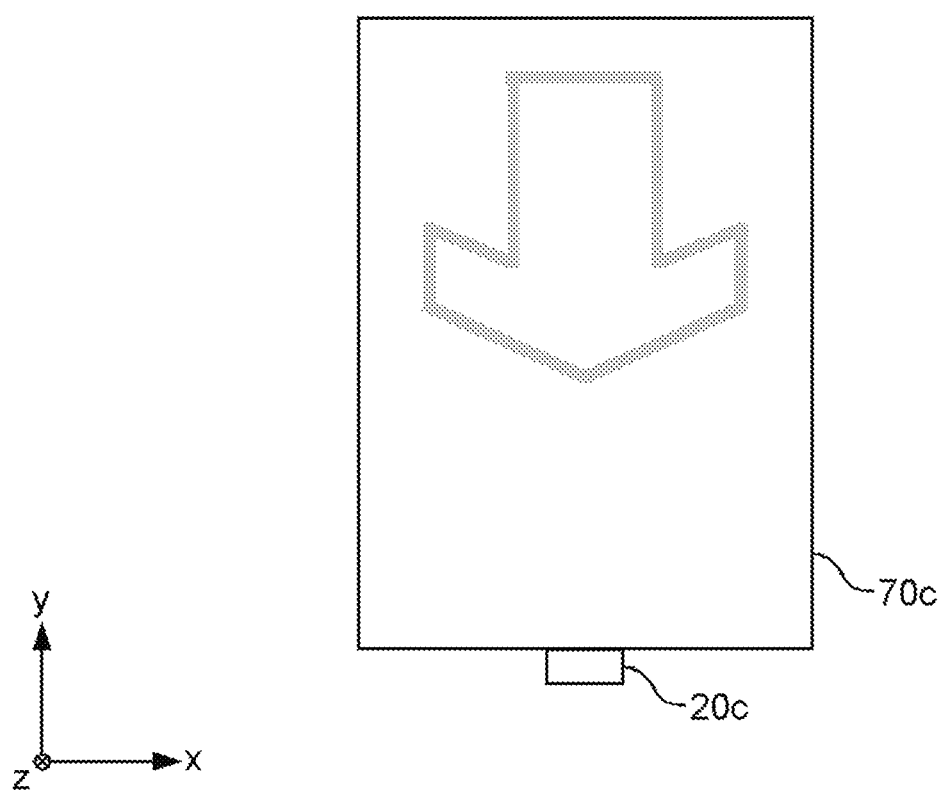
FIG. 11 is a diagram schematically illustrating leaked light from a rear surface.

FIG. 10 schematically illustrates a cross-section of the y-z plane of a display device 10C that is a variation of the display device 10B along with the luminous flux distribution. The display 10B includes the display 10a and a display 10c. The structure of the display 10a was previously described, and thus additional description thereof is omitted. A display device 10c has a structure similar to the display device 10b. The display device 10c includes a light guide plate 70c and a light source 20c. The light guide plate 70c corresponds to the light guide plate 70b of the display device 10b. The light source 20c corresponds to the light source 20b of the display device 10b. Hereinafter, the difference in components between the display device 10c and the display device 10b is described.

The light guide plate 70a and the light guide plate 70c are provided in order from the light guide plate 70c and the light guide plate 70a along the positive z-axis direction. The light guide plate 70a and the light guide plate 70c are provided such that the rear surface 72a of the light guide plate 70a faces the emission surface 71c of the light guide plate 70c.

The light guide plate 70c includes reflective surfaces 41c corresponding to the reflective surfaces 41 on the emission surface 71c in the regions 81 and 82. A plurality of reflective surfaces identical to the reflective surfaces 41c is provided on the emission surface 71c. Here, the reflective surfaces are collectively referred to as reflective surfaces 41c. The light guide plate 70c does not include reflective surfaces corresponding to the reflective surfaces 31 on the rear surface 72c. The light source 20c includes the wavelength range of light emitted from the light source 20*a* and emits light having a wavelength range broader than the above wavelength range in the visible wavelength range. Specifically, the light source 20*c* emits substantially white light. As such, the reflective surfaces 41*c* provided in the regions 81 and 82 emit substantially white light from the rear surface 72*c*. A distribution 44*c* represents the luminous flux distribution of light from the rear surface 72*c* along the y-axis direction. As illustrated by the distribution 44*c*, the amount of white light emitted from the rear surface 72*c* by the reflective surfaces 41*c* of the light guide plate 70*c* is substantially uniform over the region 81 and 82. The area and the pattern density of the reflective surfaces 41*c* are provided uniformly over the regions 81 and 82 such that the luminous flux is uniform over the regions 81 and 82.

The luminous flux I5 emitted from the rear surface 72*c* by the reflective surfaces 41*c* is greater than the luminous flux I2 emitted from the rear surface 72*c* by the reflective surfaces 31*a*. For example, I5 may be at least two times greater than I2. The distribution 46 illustrates a distribution of the total luminous flux from the rear surface 72*c* by the reflective surfaces 31*a* of the light guide plate 70*a* and the reflective surfaces 41*c* of the light guide plate 70*c* along the y-axis direction. As illustrated by the distribution 46, the luminous flux in the region 81 is represented by I5+I2.

FIG. 9 schematically illustrates leaked light from the rear surface 72*c*. As described above, the luminous flux I5 emitted from the rear surface 72*c* by the reflective surfaces 41*c* is greater than the luminous flux I2 emitted from the rear surface 72*c* by the reflective surfaces 31*a*. As such, when viewed from the rear surface 72*c*, the leaked light from the rear surface 72*c* appears light red in the region 81 and appears bright and neutral in the region 82 around the region 81. This makes it difficult to view the image formed by the light exiting from the reflective surfaces 31*a* and leaked from the rear surface 72*c*.

Specifically, the ratio of the luminous flux from the region 81 to the luminous flux from the region 82 is represented by (I5+I2)/I5. The ratio of the brightness near the boundary between the region 81 and the region 82 decreases as the I5 increases. That is, as I5 increases, the image formed by the leaked light becomes less visible. Thus, the display device 10C makes it possible to create a greater blurring effect for an image produced from the leaked light from the reflective surfaces 31*a* by ensuring I5 is greater than I2. Thus, the display device 10C also makes it possible to prevent the pattern formed by the leaked light from the reflective surfaces 31*a* from being conspicuous from the rear surface 72*c*.

The light guide plate 70*a* of the display device 10*a* and the light guide plate 70*c* of the display device 10*c* can be considered as one light guide plate. Further, it is also possible to create the same function as that of the display device 10C using a single light guide plate having one emission surface 71 and one rear surface 72 such as the light guide plate 70. It is also possible to create the same function as that of the display device 10C with a single light guide plate, for example, by using a white light source as the light source 20 and providing a reflective film that reflects the light having a wavelength range for a specific color such as red on the reflective surfaces 31 formed on the rear surface 72. A dichroic coating or the like may be applied to the reflective film.

Figure 12:
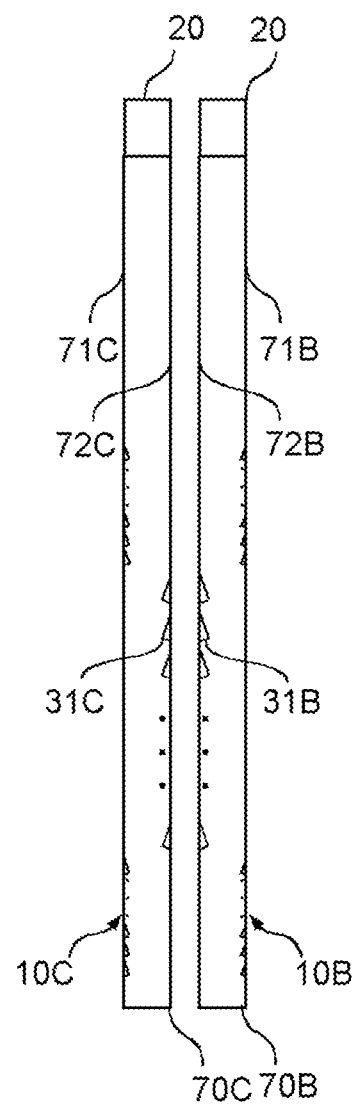
FIG. 12 is a diagram schematically illustrating a cross-section of the y-z plane of a display device.
Figure 13A:
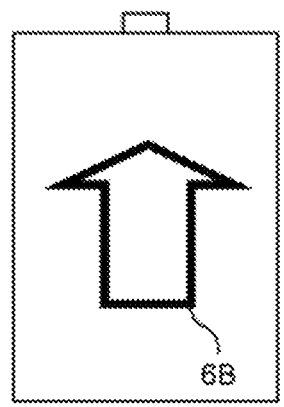
FIG. 13A and FIG. 13B are diagrams schematically illustrating an image formed by a display device.
Figure 13B:
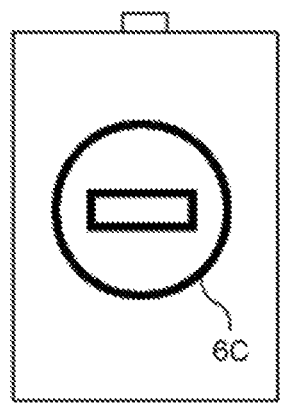

FIG. 12 schematically illustrates a cross-section of the y-z plane of a display device 100. FIGS. 13A and 13B schematically illustrates an image formed by the display device 100.

The display 100 includes the display 10B and a display 10C. The display device 10B is a variation of the display device 10. The display device 10B has the same structure as the display device 10 except for having reflective surfaces 31B for forming an image different from the image 6. Further, the display device 10C is a variation of the display device 10. The display device 10C has the same structure as the display device 10 except for having reflective surfaces 31C for forming an image different from the image 6.

The rear surface 72B of the display device 10B is arranged to face the rear surface 72C of the display device 10C. The emission surface 71B of the display device 10B serves as one of the principal surfaces of the display device 100. The emission surface 71C of the display device 10C serves as the other principal surface of the display device 100.

FIG. 13A schematically illustrates an image 6B formed by the display device 10B near the emission surface 71B of the display device 10B. FIG. 13B schematically illustrates an image 6C formed by the display device 10C near the emission surface 71C of the display device 10C. As such, the display device 100 serves to display mutually different images on the emission surface 71B of the display device 10B and on the emission surface 71C of the display device 10C.

The display 100 is able to reduce the spatial variations in the luminous flux of light leaking from the rear surface 72C of the display device 10C. Thus, this prevents the image 6B from being less visible due to the leaked light from the display device 10C. Similarly, since it is possible to reduce the spatial variation in the luminous flux of light leaking from the rear surface 72B of the display device 10B, this prevents the image 6C from being less visible due to the leaked light from the display device 10B.

Figure 14:
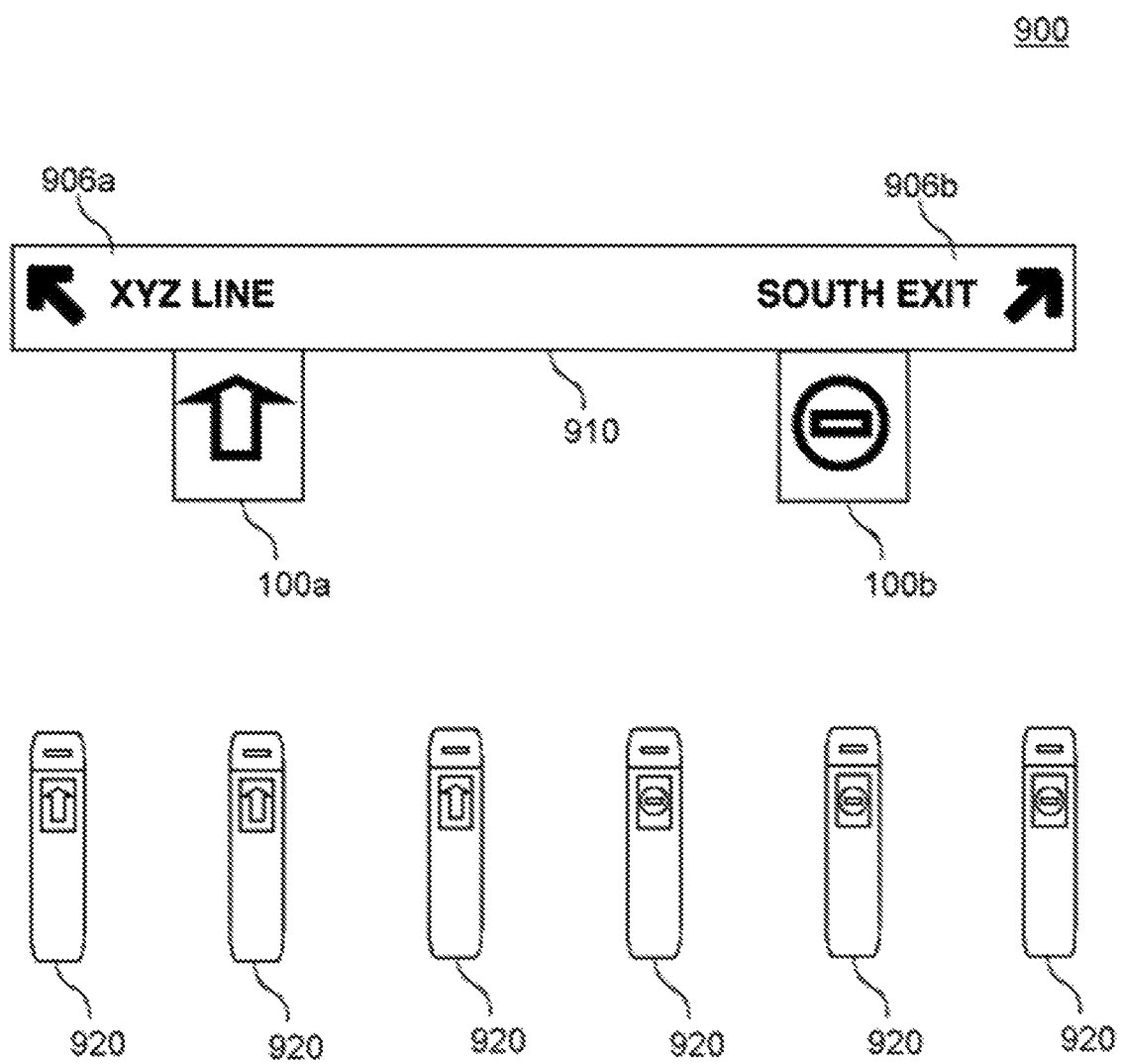
FIG. 14 is a diagram schematically illustrating a ticket gate system 900 using a display device.

FIG. 14 schematically illustrates a ticket gate system 900 using the display device 100. The ticket gate system 900 is provided with a display device 100*a*, a display device 100*b*, a display device 910, and a plurality of ticket gates 920.

The display device 100*a* and the display device 100*b* have a structure similar to the display device 100. The display device 100*a* and the display device 100*b* are provided such that the principal surfaces are oriented in different directions. Specifically, the emission surface 71B of the display device 10B included in the display device 100*a* is arranged to face substantially the same direction as that of emission surface 71C of the display device 10C included in the display device 100*b*.

The display device 100*a* and the display device 100*b* are provided above the ticket gates 920. The image 6B is an icon indicating the direction in which passage is permitted and the image 6C is an icon indicating that no entry is allowed. According to the ticket gate system 900, it is possible to use stereoscopic images to inform passengers entering a station through the ticket gates 920 and exiting the station through the ticket gates 920 of the locations of the ticket gates through which passengers can pass.

The display device 910 forms an image 906*a* informing passengers passing through the ticket gates 920 of the location of the platform and an image 906*b* informing passengers in a station of location of the exits. The image 906*a* may be perceived as recessed from the installation position of the display device 910 when viewed by passengers. The image 906*b* may be perceived as protruding from the installation position of the display device 910 when viewed by passengers in the station. A detailed description of the structure of the display device 910 is omitted since the display device 910 is similar in structure to the display device 100 and only the image produced by the display device 910 and the shape of the display device 910 are different from the same in the display device 100.

As a variation of the display device 100, two display devices similar to the display device 10B and the display device 10C may be placed over a display device. For example, a display device having a structure similar to that of the display device 10C may be provided between the display device 10B and the display device 10C with the emission surface facing the rear surface 72B of the display device 10B; a display device having a structure similar to that of the display device 10B may be provided with the rear surface facing the rear surface 71B of the display device 10C. The display device may be controlled to switch images that are displayed to the passengers entering a station through the ticket gates 920 and the passengers exiting the station through the ticket gates 920 by selecting a light source on the basis of the image to be displayed to the passengers.

One or more embodiments mentioned above describe the functions of the light guide plate 70 having the reflective surfaces 31 and the reflective surfaces 41. However, a reflective Fresnel lens may be used as optical surfaces that function similar to the reflective surfaces 31 in the light focusing portion 30. Further, the optical surfaces that allow the emission surfaces 71 to emit light via refraction or diffraction can be used as optical surfaces that function similar to the reflective surfaces 31. Similarly, the reflective Fresnel lens and the optical surfaces that allow the emission surfaces 71 to emit light by refraction or diffraction can be used as optical surfaces that function similar to the reflective surfaces 41.

Further, the optical surfaces corresponding to the reflective surfaces 31 and the optical surfaces corresponding to the reflective surfaces 41 may be provided on either one of the principal surfaces, either the emission surface 71 or the rear surface 72. For example, when the reflective surfaces 31 are provided on the rear surface 72, the optical surfaces corresponding to the reflective surfaces 41 may be provided on the rear surface 72. In this case, the optical surfaces corresponding to the reflective surfaces 41 may be refractive surfaces that emit light mainly toward the rear surface 72 by refracting the incident light. The optical surfaces corresponding to the reflective surfaces 41 may be transmissive diffraction elements that emit light mainly toward the rear surface 72 by diffracting the incident light. The optical surfaces corresponding to the reflective surfaces 41 may be reflective surfaces that emit light mainly toward the rear surface 72 by reflecting the incident light.

The optical surfaces corresponding to the reflective surfaces 31 may be provided on the emission surface 71. In this case, the optical surfaces corresponding to the reflective surfaces 31 may be refractive surfaces that emit light mainly toward the emission surface 71 by refracting the incident light. The optical surfaces corresponding to the reflective surfaces 31 may be transmissive diffraction elements that emit light mainly toward the emission surface 71 by diffracting the incident light. The optical surfaces corresponding to the reflective surfaces 31 may be reflective surfaces that emit light mainly toward the emission surface 71 by reflecting the incident light. As described above, the reflective surfaces 31 and the reflective surfaces 41 may be provide on the same principal surface of the display device 10.

The light source 20 may be a laser light source. For example, the light source 20 may be a laser diode. When using diffractive elements, coherent light belonging to substantially a single wavelength region is preferably used.

The present invention has been described using one or more embodiments, but it should be noted that the technical scope of the present invention is not limited to the above described one or more embodiments. It is clear to a person skilled in the art that various modifications and alterations to the above-described one or more embodiments are possible. It is also clear from the scope of the claims whether embodiments incorporating such modifications and alterations are included in the technical scope of the present invention.

The execution order of each process such as operation, step, and stage relating in the device, system, program, and the method is not specifically described using terms such as "before" and "prior to." It should be noted that the execution order is not limited to those described in one or more embodiments unless the output from the previous process is used in the subsequent process. Even if terms such as "first" and "next" are conveniently used in the operation flow described in the claims, and in the specification and drawings, the execution in accordance with the described order is not necessarily required.

The invention claimed is:

1. An optical device comprising:
a light guide plate that guides light in a plane parallel to a first emission surface;
a first light emission part provided in a first region of the light guide plate, the first light emission part comprising a plurality of optical surfaces whereon light guided by the light guide plate is incident, the optical surfaces causing the light incident thereon to exit from the first emission surface and a second emission surface opposite the first emission surface; and
a second light emission part provided in a second region of the light guide plate, the second light emission part comprising a plurality of optical surfaces whereon light guided by the light guide plate is incident, the optical surfaces causing the light incident thereon to exit from the first emission surface and the second emission surface, wherein:
the luminous flux from the first emission surface by each of the plurality of optical surfaces included in the first light emission part is greater than the luminous flux from the second emission surface by each of the plurality of optical surfaces included in the first light emission part;
the luminous flux from the second emission surface by each of the plurality of optical surfaces included in the second light emission part is greater than the luminous flux from the first emission surface by each of the plurality of optical surfaces included in the second light emission part; and
the luminous flux emitted from the second emission surface by the second light emission part in a portion adjacent to the first region within the second region is substantially the same as the luminous flux emitted from the second emission surface by the first light emission part in a portion adjacent to the second region within the first region.

2. The optical device according to claim 1, wherein the luminous flux from the second emission surface by the second light emission part in the second region decreases as the distance of the second light emission part from the first region increases.

3. The optical device according to claim 1, wherein
a pattern density of the plurality of optical surfaces included in the second light emission part decreases as a distance of the optical surfaces from the first region increases.

4. The optical device according to claim 1, wherein
an area of the plurality of optical surfaces included in the second light emission part decreases as a distance of the optical surfaces from the first region increases.

5. The optical device according to claim 1, wherein
the second light emission part is provided on the surface opposite the surface whereon the first light emission part is provided.

6. The optical device according to claim 1, wherein
the first light emission part is provided on the second emission surface of the light guide plate, and
the second light emission part is provided on the first emission surface.

7. The optical device according to claim 1, wherein
the light emitted from the first emission surface by the first light emission part produces an image configured for viewing from a position near the first emission surface outside the light guide plate.

8. The optical device according to claim 7, wherein
the second light emission part causes the second emission surface to emit light which produces an image that is blurrier than the image produced by light emitted from the first emission surface.

9. The optical device according to claim 1, wherein
the second light emission part is provided in the first region and the second region, the second light emission part emitting light of a complementary color to the color of the light emitted from the second emission surface by the first light emission part, and the luminous flux from the second emission surface by the first light emission part and the second light emission part is substantially uniform over the first region and the second region.

10. The optical device according to claim 1, wherein
the second light emission part is provided in the first region and the second region and emits white light from the second emission surface, and
the luminous flux from the second emission surface by the second light emission part is greater than the luminous flux from the second emission surface by the first light emission part.

11. The optical device according to claim 1, wherein
the first light emission part comprises a plurality of first light focusing portions each having optical surfaces whereon the light guided by the light guide plate is incident, the optical surfaces causing the first emission surface to emit light in the direction in which the emission light substantially converges on a single convergence point or convergence line in a space, or substantially diverges from a single convergence point or convergence line in space, and
the convergence points or the convergence lines are mutually different among the plurality of first light focusing portions and a group of the plurality of convergence points or convergence lines forms an image in a space.

12. The optical device according to claim 11, wherein
each plurality of first light focusing portions is formed along a predetermined line in a plane parallel to the first emission surface.

13. The optical device according to claim 1, wherein
the second light emission part comprises a plurality of second light focusing portions each having optical surfaces whereon the light guided by the light guide plate is incident, the optical surfaces causing the second emission surface to emit light in the direction in which the emission light substantially converges on a single convergence point or convergence line in a space, or substantially diverges from a single convergence point or convergence line in space, and
the convergence points or the convergence lines of light emitted from the second light emission part are mutually different among the plurality of second light focusing portions and a group of the plurality of convergence points or convergence lines of light emitted from the second light emission part forms an image in a space.

14. The optical device according to claim 1, wherein
the pattern density of the plurality of optical surfaces included in the first light emission part is less than or equal to 30%.

15. An optical system comprising:
an optical device according to claim 1; and
a second optical device provided to face the second emission surface of the optical device, wherein
the second optical device comprises:
a second light guide plate that guides light in a plane parallel to an emission surface; and
a light emission part comprising having a plurality of optical surfaces whereon light guided by the light guide plate is incident, the optical surfaces causing the light incident thereon to exit from the emission surface of the second light guide plate, and
the surface opposite the emission surface of the second light guide plate faces the second emission surface of the light guide plate;
the light emitted from the first emission surface by the plurality of optical surfaces included in the first light emission part forms an image configured for viewing from a position near the first emission surface outside the light guide plate; and
the light emitted from the emission surface by the plurality of optical surfaces included in the light emission part of the second light guide plate forms an image configured for viewing from a position near the emission surface outside the second light guide plate.

* * * * *